(12) United States Patent
Lin et al.

(10) Patent No.: US 6,999,081 B1
(45) Date of Patent: Feb. 14, 2006

(54) METHOD AND APPARATUS FOR DISPLAYING PRODUCTION DATA FOR IMPROVED MANUFACTURING DECISION MAKING

(75) Inventors: Kuo-Chen Lin, Tainan (TW); Ming-Hong Hsieh, Tainan (TW)

(73) Assignee: Taiwan Semiconductor Manufacturing Company, Hsin-Chu (TW)

( * ) Notice: Subject to any disclaimer, the term of this patent is extended or adjusted under 35 U.S.C. 154(b) by 409 days.

(21) Appl. No.: 09/993,067

(22) Filed: Nov. 14, 2001

(51) Int. Cl.
*G09G 5/22* (2006.01)

(52) U.S. Cl. .................................................. 345/440.2

(58) Field of Classification Search ................ 700/100; 345/440, 440.2; 703/95
See application file for complete search history.

(56) References Cited

U.S. PATENT DOCUMENTS

| | | | | |
|---|---|---|---|---|
| 5,559,710 A | * | 9/1996 | Shahraray et al. | 700/100 |
| 5,612,886 A | | 3/1997 | Weng | 700/101 |
| 5,768,133 A | | 6/1998 | Chen et al. | 700/95 |
| 5,818,716 A | | 10/1998 | Chin et al. | 700/100 |
| 5,841,677 A | | 11/1998 | Yang et al. | 702/176 |
| 5,889,673 A | | 3/1999 | Pan et al. | 700/97 |
| 6,031,547 A | * | 2/2000 | Kennedy | 345/440 |
| 6,230,068 B1 | * | 5/2001 | Wu et al. | 700/121 |
| 6,587,108 B1 | * | 7/2003 | Guerlain et al. | 345/440 |
| 6,865,509 B1 | * | 3/2005 | Hsiung et al. | 702/182 |

OTHER PUBLICATIONS

Hussaini, Simple Bar Graph Displays for Control Variables and Alarm Status, Electro/94 International. Conference Proceedings. Combined Volumes. , May 10-12, 1994 Page(s): 651-656.*

* cited by examiner

*Primary Examiner*—Sumati Lefkowitz
*Assistant Examiner*—Motilewa Good-Johnson

(57) ABSTRACT

A new data processing and display method for use in interactive manufacturing process management is achieved. A first variable value, such as WIP, for a manufacturing stage is uploaded from a database and is subtracted from a first target value to obtain a first variable variance. A first variable variance bar is displayed above a stage axis on a graphical display device and is non-filled if the first variable variance is positive and is filled if the first variable variance is negative. A second variable value, such as production moves, is uploaded and is subtracted from a second target value to obtain a second variable variance. A second variable value bar is displayed below the stage axis on the graphical display device and is non-filled. A second variable variance bar is displayed below the second variable value bar on the graphical display device if the second variable variance is positive.

20 Claims, 6 Drawing Sheets

KEY STAGE REPORT PAGE: 1

DATE: 1/27/01    TIME: 16:55:47

| STAGE ID | WIP | PB3K | O_BKHWIP | BANK | CUMWP | OUT | TGT | FOUT |
|---|---|---|---|---|---|---|---|---|
| WF1_START | 226 | 0 | 1 | 70 | 65909 | 725 | 1300 | 1833 |
| STAOX1_RM | 37 | 0 | 0 | 18 | 65683 | 425 | 750 | 1075 |
| NWL1D1_PH1 | 0 | 0 | 0 | 0 | 65646 | 0 | 0 | 0 |
| NWL1D1_IM2 | 0 | 0 | 0 | 0 | 65646 | 0 | 0 | 0 |
| NWL1D1_AN | 0 | 0 | 0 | 0 | 65646 | 0 | 0 | 0 |
| NWL1_PH | 50 | 0 | 50 | 0 | 65646 | 400 | 600 | 1011 |
| NWL1_IM | 325 | 0 | 0 | 0 | 65596 | 50 | 600 | 126 |
| PWL1_PH1 | 50 | 0 | 0 | 0 | 65271 | 175 | 600 | 442 |
| PWL1_IM1 | 50 | 0 | 0 | 0 | 65271 | 200 | 600 | 506 |
| WL1_D1 | 750 | 0 | 0 | 34 | 65171 | 275 | 750 | 695 |
| PAD_OX | 700 | 0 | 25 | 109 | 64421 | 825 | 1400 | 2086 |
| SN1_DP | 862 | 0 | 0 | 641 | 63721 | 324 | 1400 | 891 |
| SN1BA1_DP | 199 | 0 | 74 | 197 | 62859 | 100 | 125 | 253 |
| OD1_PH | 353 | 0 | 42 | 12 | 62660 | 457 | 1350 | 1156 |
| OD1_ET | 326 | 100 | 0 | 0 | 62307 | 200 | 700 | 506 |
| FLD1_OX2 | 0 | 0 | 0 | 0 | 61981 | 0 | 0 | 0 |

FIG. 1 Prior Art

METHOD AND APPARATUS FOR DISPLAYING PRODUCTION DATA FOR IMPROVED MANUFACTURING DECISION MAKING

BACKGROUND OF THE INVENTION (1) Field of the Invention

The invention relates to data processing and analysis of manufacturing data, and more particularly, to a method and an apparatus for an improved graphical depiction of work-in-progress and production moves data for use in integrated circuit manufacturing management.

(2) Description of the Prior Art

Efficient management of a integrated circuit manufacturing plant is a difficult technical and managerial challenge. Meeting customer delivery dates, maintaining a balanced manufacturing line, working around equipment maintenance and repair, and responding to frequently changing customer orders are among the problems facing the manufacturing manager. To properly manage the production facility, manufacturing managers rely on data reports that provide 'snapshots' of the status of the wafer fab.

Referring now to FIG. 1, an example of a prior art data report is illustrated. A Key Stage Report 10, or KSR, is a summary report that a manufacturing supervisor uses to analyze the fabrication facility or a cell within such a facility. A KSR 10 is generated from the manufacturing information system (MIS) database for the fabrication facility. The KSR 10 shown provides summary information for each key stage in the plant. Key stages in the production process are designated by stage ID labels. For example, the first key stage in the process is the wafer start or WF1_START stage.

Several parameters are provided for each key stage. In this example KSR 10, the work-in-progress (WIP) is given for the WF1_START stage as 226 wafers. The WIP for each stage is provided, along with several other parameters, such as the held WIP (HWIP), the banked WIP (BANK), and the cumulative WIP (CUMWP). Production line supervisors use a KSR 10 in this form to analyze the balance of the production line. The supervisors make decisions, such as how many production lots to release on to the floor or where to focus manpower, based on their analysis of the KSR. Maintaining a balanced production line is a critical strategy in achieving optimum equipment utilization, on- time delivery, and minimum costs.

The KSR 10 shown in FIG. 1 has a distinct disadvantage because it is a text-only report. It is difficult for the line supervisor or the production operator to have an intuitive feeling as to where the production imbalance lies. Unless the person analyzing the textual data has a wealth of experience, it is likely that the large listing of data will not be very useful in the decision making process.

Several prior art inventions disclose manufacturing decision making systems and database tools. U.S. Pat. No. 5,612,886 to Weng discloses a manufacturing control system using a computer control of workflow. WIP is sorted by priority and by queue time. A dynamic dispatch ranking is calculated and the highest priority production stage is selected automatically. U.S. Pat. No. 5,818,716 to Chin et al teaches a dispatching algorithm for use in integrated circuit manufacture. A required turn rate (RTR) metric is calculated for each wafer lot. The RTR is then used for automatic dispatching of lots to thereby maximize throughput and equipment utilization. U.S. Pat. No. 5,559,710 to Shahraray et al discloses a system and a method to schedule the release of production lots into a factory. A continuity index (CI) is defined for each wafer lot. A factory profile curve of optimum CI value is established. The dispatch of lots is automatically controlled to force the current CI value towards the optimum CI curve. U.S. Pat. No. 5,889,673 to Pan et al teaches a system and a method to automatically and to dynamically dispatch lots in an IC manufacturing environment. A stage achievement rate (SAR) is calculated and used in the automatic dispatch selection algorithm. U.S. Pat. No. 5,841,667 to Yang et al discloses a system and a method to automatically dispatch lots to available machine processes. The average process time, the average number of lots per batch in the succeeding process, and the allowable lots metrics are used in the dispatch algorithm. U.S. Pat. No. 5,768,133 to Chen et al teaches a system and a method for interactive data processing in an IC manufacturing plant. The graphical user interface (GUI) displays data, including WIP data.

SUMMARY OF THE INVENTION

A principal object of the present invention is to provide an effective method and apparatus for displaying production data.

A further object of the present invention is to display work-in-progress (WIP) and production moves data in a particularly useful way.

A yet further object of the present invention is to first calculate and to then display WIP variance and production moves variance data.

Another yet further object of the present invention is to present variance data in an intuitive bar graph format that is easy to interpret.

Another yet further object of the present invention is to integrate the novel bar graph display of variance data with textual data in a single display window.

Another yet further object of the present invention is to provide sub-category splits within a bar chart to allow additional information to be incorporated in the bar format.

In accordance with the objects of this invention, a new data processing and display method for use in interactive manufacturing process management is achieved. A first variable value, such as WIP, for a manufacturing stage is uploaded from a database. The first variable value is subtracted from a first target value to obtain a first variable variance. A first variable variance bar is displayed above a stage axis on a graphical display device. The first variable variance bar is non-filled if the first variable variance is positive and is filled if the first variable variance is negative. A second variable value, such as production moves, is uploaded for the manufacturing stage from the database. The second variable value is subtracted from a second target value to obtain a second variable variance. A second variable value bar is displayed below the stage axis on the graphical display device. The second variable value bar is non-filled. A second variable variance bar is displayed below the second variable value bar on the graphical display device if the second variable variance is positive. The second variable variance bar is filled.

Also in accordance with the objects of this invention, a new data processing and display apparatus for use in interactive manufacturing process management is achieved. The apparatus first comprises a means of uploading a first variable value, such as WIP, and a second variable value, such as production moves, for a manufacturing stage from a database. A means of storing the first variable value, the second variable value, and computation results is included. A means of calculating a first variable variance and a second variable variance is included. A graphical display means capable of displaying a first variable variance bar, a second variable value bar, and a second variable variance bar is included. The first variable variance bar is displayed above a stage axis, is non-filled if the first variable variance is positive, and is filled if the first variable variance is negative. The second variable value bar is displayed below the stage axis and is non-filled. The second variable variance bar is filled and is displayed below the second variable value bar if the second variable variance is positive.

BRIEF DESCRIPTION OF THE DRAWINGS

In the accompanying drawings forming a material part of this description, there is shown:

FIG. 1 illustrates a key stages report (KSR) of the prior art.

DESCRIPTION OF THE PREFERRED EMBODIMENTS

The preferred embodiment discloses the method and the apparatus of the present invention. In the preferred embodiment, the present invention is applied to the analysis and display of WIP and production moves data used in integrated circuit manufacture. It should be clear to those experienced in the art that the present invention can be applied and extended without deviating from the scope of the present invention.

Figure 2:
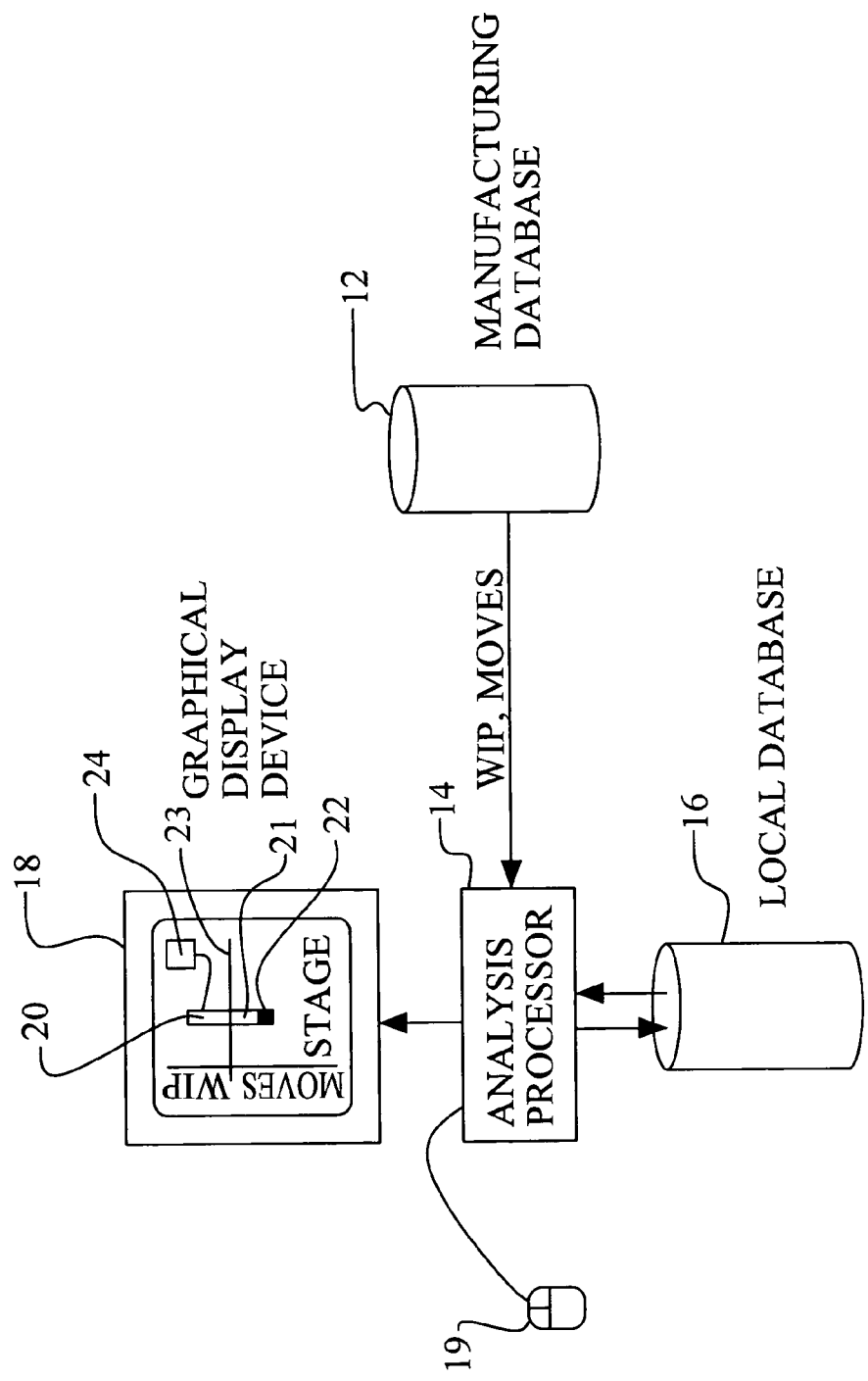
FIG. 2 illustrates a simplified diagram of the preferred embodiment of the apparatus of the present invention.

Referring now particularly to FIG. 2, a simplified diagram of the preferred embodiment of the apparatus of the present invention is shown. Several important features are illustrated. First, manufacturing data for the processes in the plant are stored in the manufacturing database 12. A manufacturing information system (MIS) records data on every production lot, process run, and production move in the processing plant. The MIS tracks the WIP at each stage in the processing sequence. For example, a key thermal process may have 6 product lots, each containing 25 wafers, as WIP for that stage. Further, the entire fabrication facility might have hundreds or thousands of product lots as WIP in various stages of processing.

The MIS also tracks the number of product moves through each stage of the process. For example, a key photolithographic machine may have processed 20 product lots on a given shift. A total of 20 production moves would be credited to that process stage.

A key feature of the present invention is that the apparatus must have a means of uploading the desired manufacturing variables for each stage from the manufacturing database 12. The records are uploaded into the analysis processor 14 and then stored in a local database 16 for retrieval as needed. For example, a first variable value, such as WIP, and a second variable value, such as production moves, for each key process stage may be uploaded from the manufacturing database 12.

Another key feature of the present invention is that the analysis processor 14, which may comprise a personal computer, must have a means of calculating a first variance and a second variance. A first variance may comprise, for example, the difference between the standard, or expected, WIP for a specific stage and the actual WIP for that stage. Alternatively, the second variance may comprise the difference between the target, or expected, production moves at a stage and the actual moves at that stage. In either case, the analysis processor 14 must perform a subtraction operation and store the resulting variance value in the local database 16.

Another important feature of the apparatus of the present invention is the inclusion of a graphical display device 18. The graphical display device must have a means of displaying a first variable variance bar 20, a second variable value bar 21, and a second variable variance bar 22. The particular content and arrangement of each bar is illustrated in greater detail in FIGS. 3 and 6 and will be described in detail below. The bars 20, 21, and 22 are displayed in a novel format above and below a stage axis 23. In addition, the graphical display device may have a means to display additional textual data 24, such as specific data values from the MIS database 12 for a particular stage. This textual data 24 may be accessed by a user when a particular bar, such as the first variable variance bar 20, is selected using a pointing device, such as a mouse 19. The graphical display device 18 may comprise, for example, a CRT screen for a personal computer.

Figure 3:
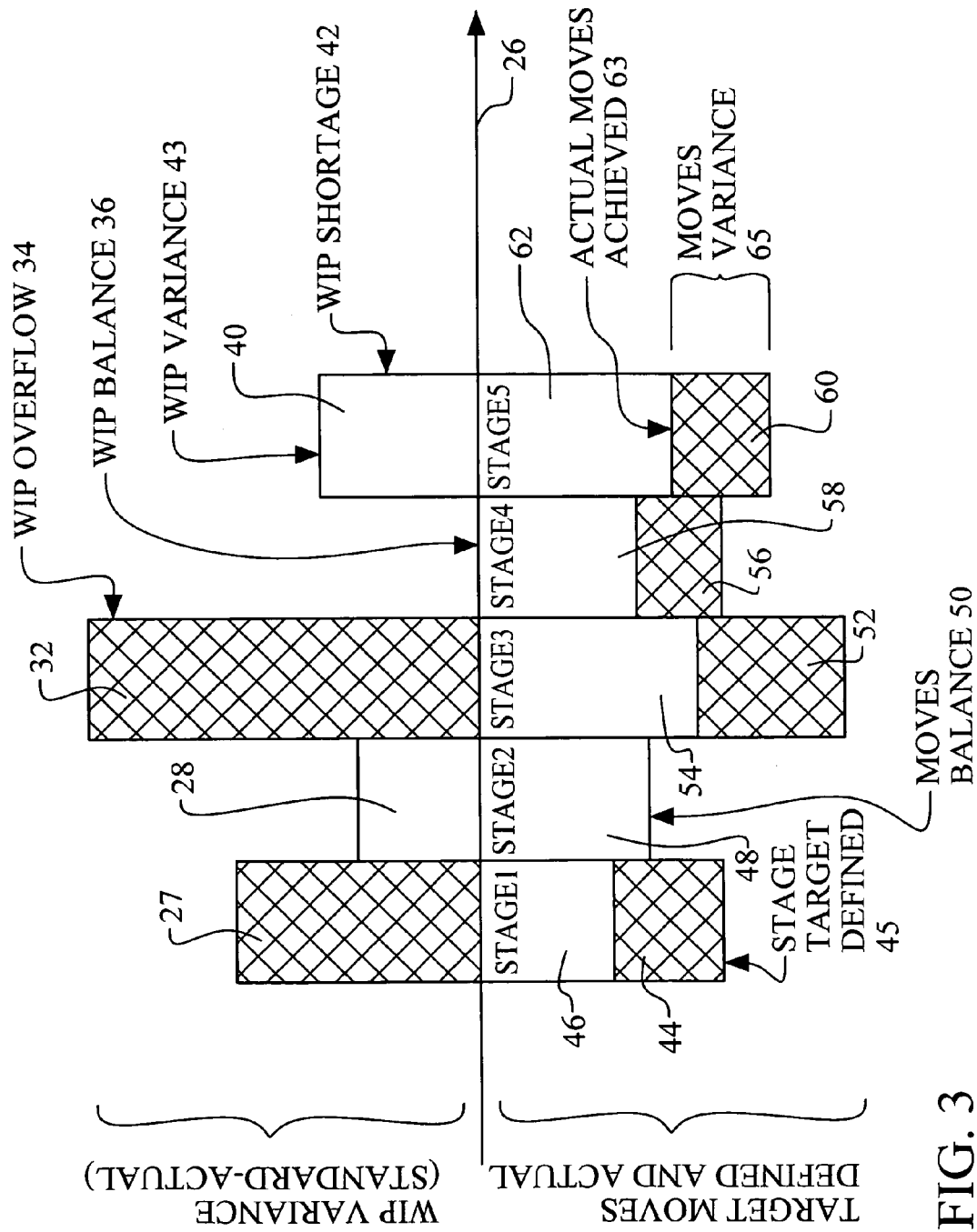
FIG. 3 illustrates the preferred manufacturing data display method of the present invention.

Referring now particularly to FIG. 3, the preferred display format of the present invention is illustrated. Several important and novel features of the present invention are shown. The bar chart data is plotted on the stage axis 26. Each location on the stage axis 26 corresponds to a different key stage of the production process. It is not necessary that every process step be plotted. Usually, several steps may be grouped together into a stage, such as a photolithographic exposure stage or an ion implantation stage. In FIG. 3, five key stages are shown as stages 1 through 5.

It is important to note that each stage has a bar 27 above the stage axis 26 and a combination bar 46 and 47 below the stage axis 26. The bars 27, 28, 32, and 40 above the stage axis 26 depict the WIP variance value for each stage. Each WIP variance bar 27, 28, 32, and 40 shows the absolute value of the first variable variance. In the preferred embodiment, the first variable variance is the WIP variance.

If the WIP variance is positive, this means the standard, or expected, WIP at that stage is greater than the actual current WIP. This indicates an underflow, or shortage 42, of WIP. The shortage WIP condition is shown as a clear, or non-filled, bar such as the bars 28 and 40 for stages 2 and 5. If the WIP variance is negative, this means the actual WIP for the stage exceeds the standard, or expected WIP. This condition is called a WIP overflow 34 and is plotted as a filled bar. WIP overflow conditions are shown in bars 27 and 32 for stages 1 and 3. If the standard WIP and the actual WIP for a stage are equal, then the resulting bar has a value of zero. This is a balanced WIP condition and is depicted by the "zero value" bar of stage 4.

The bars below the stage axis 26 plot two values, the second variable value and the second variable variance. For the preferred embodiment, the second variable is the production moves through the key stage. Bars 46, 48, 54, 58, and 62 display the actual production moves through the key stages 1 through 5. Bars 44, 52, 56, and 60 depict the production moves variance for stages 1 and 3 through 5.

The production moves value at each stage is plotted below the stage axis 26. The value at the stage axis is zero and ascends as the bar extends below the stage axis 26. The production moves value bars 46, 48, 54, 58, and 62 are clear, or non-filled, and indicate the actual number of product moves 63 achieve at each of stages 1 through 5.

The actual production moves for each stage are subtracted from the target, or expected, production moves for that stage. The resulting value is the production moves variance. The production moves variance is plotted as bars 44, 52, 56, and 60 and is filled. Note that the production moves variance bars 44, 52, 56, and 60 are added to the end of the actual production moves bars 46, 48, 54, 58, and 62 to form combination bars. The sum of the actual production moves and the moves variance is the stage target value 45 which is pre-defined for each key stage. The magnitude of the production variance bars 44, 52, 56, and 60 indicates that fewer product moves than expected went through stages 1, 3, 4, and 5. The absence of a production moves variance bar 50 for stage 2 indicates that actual production moves for stage 2 met or exceeded the target moves value.

The novel arrangement and the filling of the bars in the WIP and production moves display of the preferred embodiment provide several advantages. First, it is very easy for a line supervisor to see if the WIP is under flowing, overflowing, or in balance for each key stage. Even a junior supervisor can easily see where the WIP is stacking up or is disappearing from the process line. Large filled bars 32, such as at stage 3, indicate excessive WIP buildup. Large non-filled bars 40, such as at stage 5, indicate significant WIP underflow. Stages with small or no bars 36, as at stage 4, are in good balance.

Second, it is easy to see which stages are not moving product through at the expected rate. The relative size of the non-filled bar 54 and the filled bar 52 for stage 3 indicates that the stage may be significantly slowed. By comparison, the absence of a filled bar 50 for stage 2 indicates the stage may be working well.

Third, since the WIP and the production moves are interrelated and both critical to proper line balance, the fact that each is plotted in close proximity for each stage helps the line supervisor see, for example, how a stage with a low production moves performance is creating an excessive WIP buildup.

Figure 4:
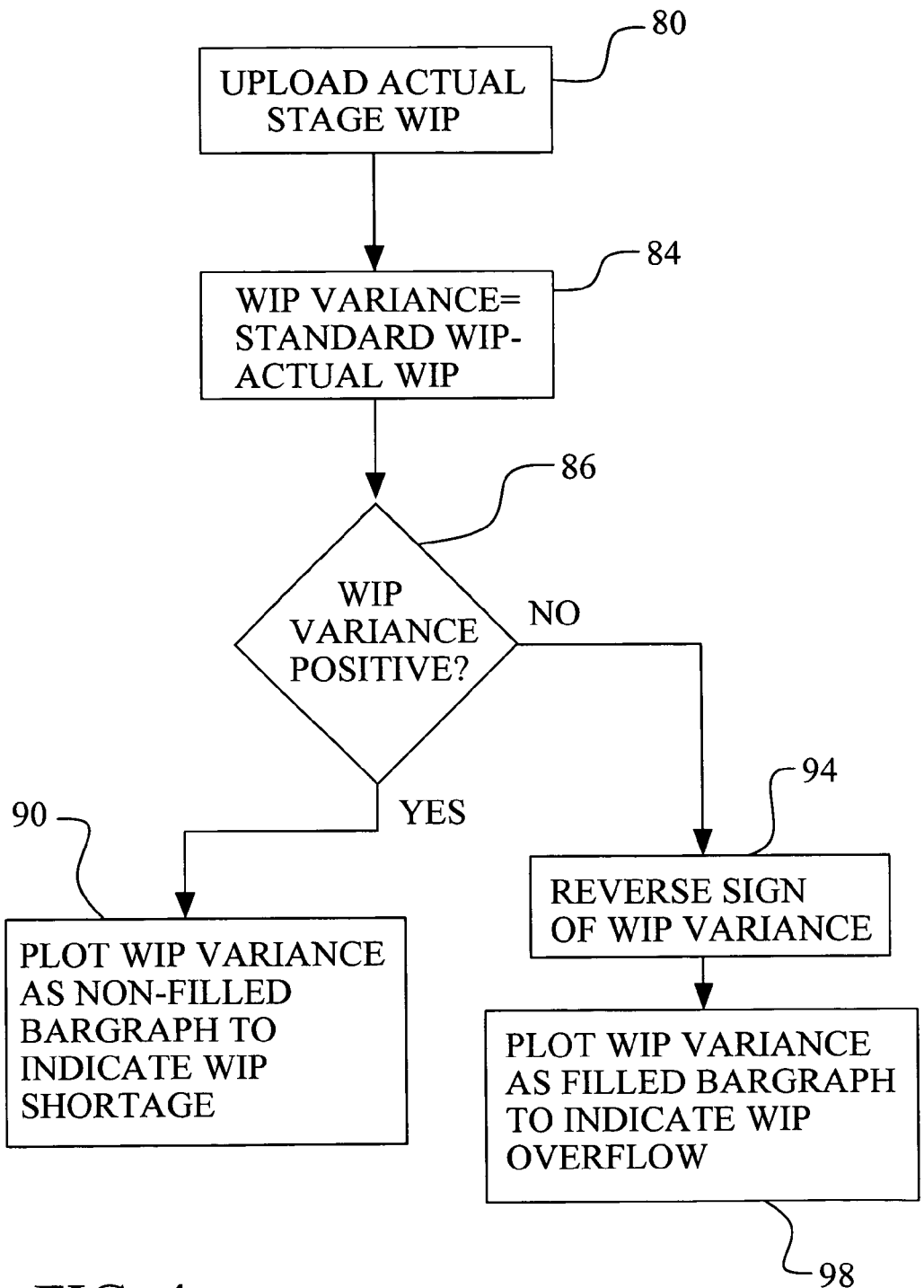
FIGS. 4 and 5 illustrate a flow chart of the preferred embodiment of the method of the present invention.
Figure 5:
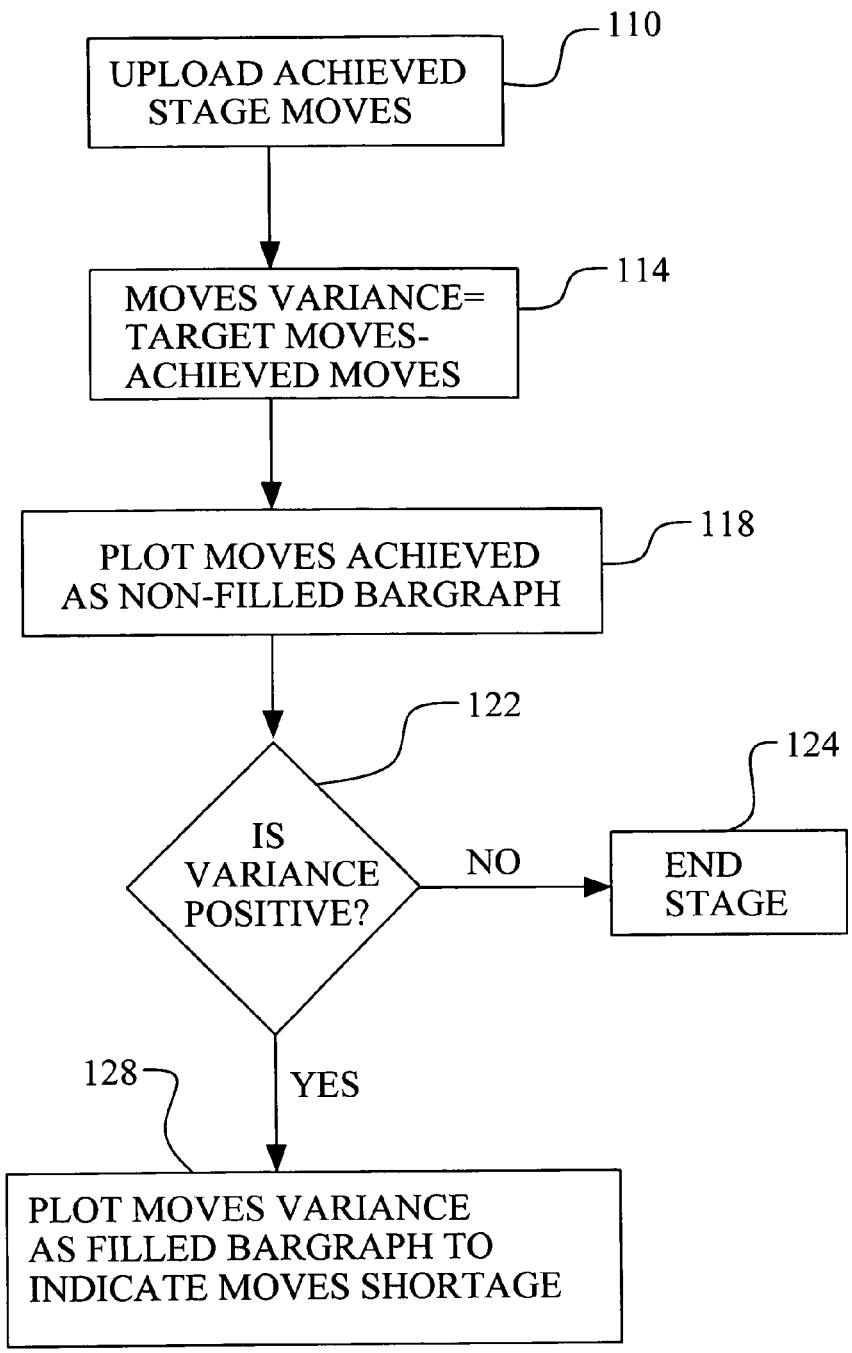

Referring now to FIGS. 4 and 5 a flow chart of the preferred embodiment of the method of the present invention is illustrated. Referring particularly to FIG. 4, the WIP variance method is shown, and several important features are illustrated. The steps of this method are preferably performed by a computer program. First, the actual WIP value for each stage is uploaded in step 80. The actual WIP values are uploaded from the MIS database and, preferably, stored in a local database. The WIP variance is then calculated. The WIP variance is calculated by subtracting the actual WIP value from the standard WIP value as shown in step 84.

The WIP variance is then tested to see it is a positive number in step 86. This is an important feature since a positive WIP variance indicates a WIP shortage at that stage. A negative WIP variance indicates a WIP overflow at that stage. If the WIP variance is positive, the WIP variance value is plotted and displayed as a non-filled bar in step 90. Conversely, if the WIP variance is non-positive, then the sign of the WIP variance value is reversed in step 94. The overflow WIP variance value is then plotted as a filled bar in step 98. A zero WIP variance is plotted as a zero value and, therefore, no bar is displayed.

Referring particularly to FIG. 5, the production moves variance method is shown, and several important features are illustrated. Once again, the steps of this method are preferably performed by a computer program. First, the actual production moves value for each stage is uploaded in step 110. The actual moves values are uploaded from the MIS database and, preferably, stored in a local database. The moves variance is then calculated. The moves variance is calculated by subtracting the actual moves value from the target, or standard, moves value as shown in step 114.

The actual achieved moves for each stage is plotted as a non-filled bar graph below the stage axis in step 118. The moves variance is then tested to see it is a positive number in step 122. This is an important feature since a positive moves variance indicates a moves shortage at that stage. A negative moves variance indicates that the number of moves at the stage have reached or exceeded the target. If the moves variance is positive, the moves variance value is plotted and displayed as a filled bar in step 128. The moves variance bar is appended to the bottom of the actual moves bar plotted in step 118. Conversely, if the moves variance is non-positive, then the actual moves is equal to or exceeds the target value and no bar is plotted in step 124.

Figure 6:
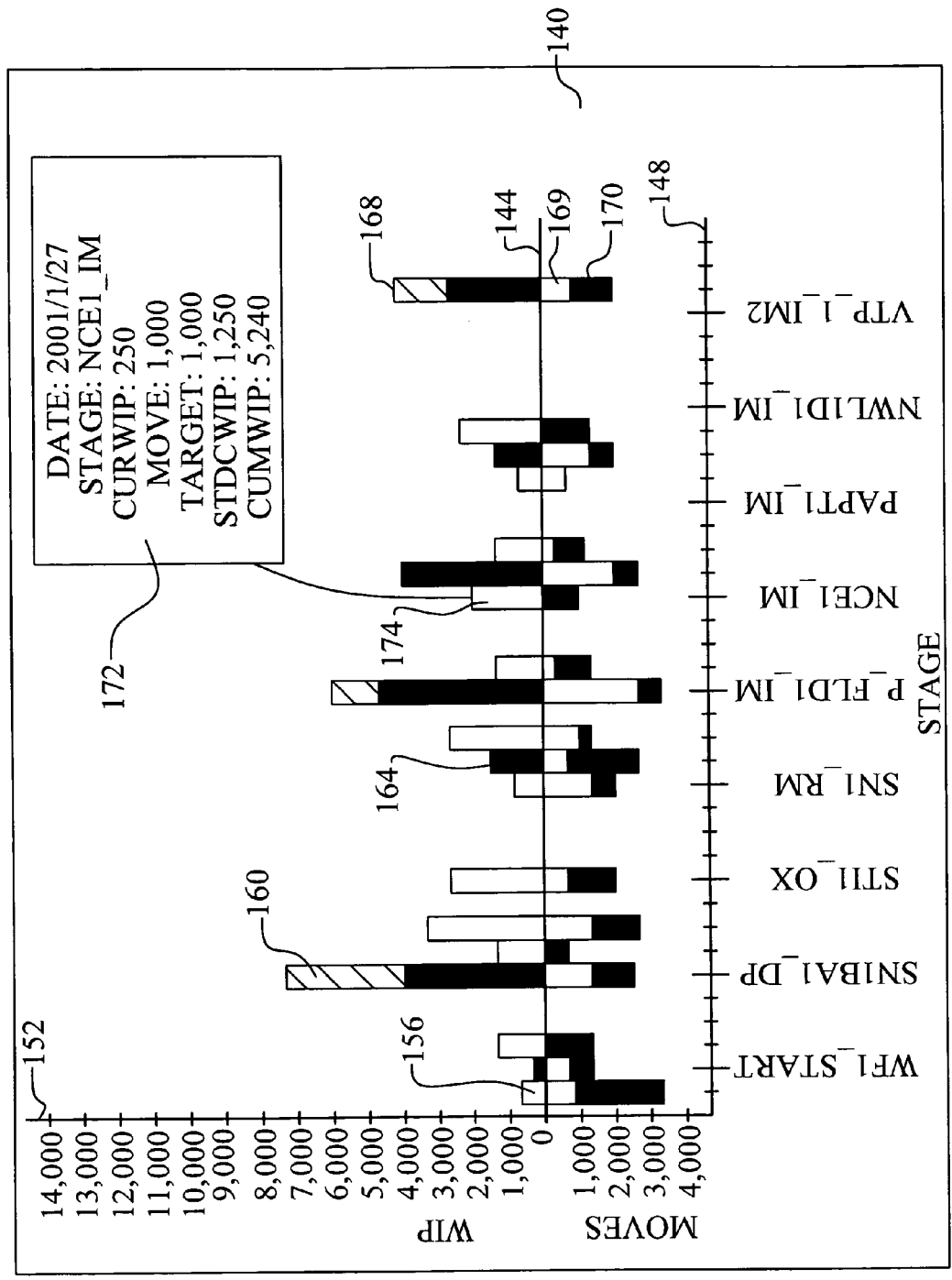
FIG. 6 illustrates the preferred manufacturing data display method on a graphical users interface (GUI) window with a selected textual information window.

Referring now to FIG. 6, the preferred manufacturing data display method is illustrated. A graphical users interface (GUI) window 140 displays the production data in the novel format of the present invention. A stage axis 144 is displayed horizontally across the window 140. A stage label axis 148 provides label context for the key stages. A WIP and moves axis 152 is displayed vertically on the left side of the window. The WIP and moves axis 152 provides a quantitative scale for the bar plots.

Bar plots of the WIP variance 156 and 164 are displayed above the stage axis. These WIP variance bars 156 and 164 may be displayed filled or non-filled to signify WIP shortage or overflow, respectively. The actual production moves values are displayed as bars 169 below the stage axis 144 and are non-filled. The production moves variance values are displayed as bars 170 appended below the production moves value bars 169. The production moves variance bars 170 are filled. The filled patterns for the bars may comprise, for example, color filled, texture filled, or gray-scale filled.

Note that a sub-category bar 160 and 168 may be displayed above the work-in-progress variance bar 156. A sub-category bar 160 signifies that a part of the overall value of the WIP variance falls into a predefined category. For example, a part of the WIP variance value for the SN1BA1_DP key stage may comprise WIP being held for engineering evaluation. This "held WIP" may be displayed as the "held WIP" sub-category bar 160 and is distinctively filled. Additional sub-categories may be displayed on the same window with distinctive fill patterns, such as in sub-category bar 168.

Note that the graphical user interface window may be further capable of displaying text values. For example, the WIP value, the WIP variance, the production moves value, and the production moves variance for a stage may be displayed as text data in an inset box 172. This feature allows the user to select a particular key stage, such as NCE1_IM, and display the actual data values as text. The selection may be actuated by the user by, for example, a pointing device such as a computer mouse.

The advantages of the present invention may now be summarized. First, the present invention provides a method and an apparatus to display WIP and production moves data in a particularly useful way. Second, the present invention is able to calculate and to display both WIP variance to target and production moves variance to target data. Third, the variance data is presented in a novel and intuitive bar graph format that is easy to interpret. Finally, the ability to provide sub-category bar splits within a bar chart and to display actual text values in an inset box provides the user with a powerful and easy to use production management system.

As shown in the preferred embodiments, the novel method and apparatus of the present invention provide an effective data processing and manufacturing management tool.

While the invention has been particularly shown and described with reference to the preferred embodiments thereof, it will be understood by those skilled in the art that various changes in form and details may be made without departing from the spirit and scope of the invention.

What is claimed is:

1. A data processing and display method for use in interactive manufacturing process management comprising:
   uploading a first variable value for a manufacturing stage from a database;
   subtracting said first variable value from a first target value to obtain a first variable variance;
   displaying a first variable variance bar above a stage axis on a graphical display device wherein said first variable variance bar is non-filled if said first variable variance is positive and is filled if said first variable variance is negative;
   uploading a second variable value for said manufacturing stage from said database;
   subtracting said second variable value from a second target value to obtain a second variable variance;
   displaying a second variable value bar below said stage axis on said graphical display device wherein said second variable value bar is non-filled; and
   displaying a second variable variance bar below said second variable bar on said graphical display device, wherein if said second variable variance is positive said second variable variance bar is filled,
   wherein said first target value and said second target value are not graphically shown on said graphical display device.

2. The method according to claim 1 wherein said first variable comprises work-in-progress (WIP).

3. The method according to claim 1 wherein said second variable comprises production moves.

4. The method according to claim 1 wherein said filled bars comprise any of the group of: color filled, texture filed, and gray-scale filled.

5. The method according to claim 1 wherein said manufacturing process comprises integrated circuit manufacturing.

6. The method according to claim 1 further comprising displaying said first variable, said first variable variance, said second variable, and said second variable variance for said stage as text data on said graphical display device.

7. The method according to claim 1 further comprising displaying a sub-category bar above said first variable variance bar wherein said sub-category bar comprises an amount of said first variable within a defined sub-category and wherein said subcategory bar is distinctively filled.

8. A data processing and display method for use in interactive integrated circuit manufacturing process management comprising:
   uploading a work-in-progress value for a manufacturing stage from a database;
   subtracting said work-in-progress value from a work-in-progress target value to obtain a work-in-progress variance;
   displaying a work-in-progress variance bar above a stage axis on a graphical display device wherein said work-in-progress variance bar is non-filled if said work-in-progress variance is positive and is filled if said work-in-progress variance is negative;
   uploading a production moves value for said manufacturing stage from said database;
   subtracting said production moves value from a production moves target value to obtain a production moves variance;
   displaying a production moves value bar below said stage axis on said graphical display device wherein said production moves value bar is non-filled; and
   displaying a production moves variance bar below said production moves value bar on said graphical display device, wherein if said if said production moves variance is positive said production moves variance bar is filled,
   wherein said work-in-progress target value and said production moves target value are not graphically shown on said graphical display device.

9. The method according to claim 8 wherein said filled bars comprise any of the group of: color filled, texture filled, and gray-scale filled.

10. The method according to claim 8 further comprising displaying said work-in-progress value, said work-in-progress variance, said production moves value, and said production moves variance for said stage as text data on said graphical display device.

11. The method according to claim 8 further comprising displaying a sub-category bar above said work-in-progress variance bar wherein said subcategory bar comprises an amount of said work-in-progress value within a defined sub-category and wherein said sub-category bar is distinctively filled.

12. A data processing and display apparatus for use in interactive manufacturing process management comprising:
   a means of uploading a first variable value and a second variable value for a manufacturing stage from a database;
   a means of storing said first variable value, said second variable value, and computation results;
   a means of calculating a first variable variance and a second variable variance, wherein said first variable variance is obtained by subtracting said first variable value from a first target value, and said second variable variance is obtained by subtracting said second variable value from a second target value; and
   a graphical display means capable of displaying a first variable variance bar, a second variable value bar, and a second variable variance wherein said first variable variance bar is above a stage axis, is non-filled if said first variable variance is positive, and is filled if said first variable variance is negative, wherein said second variable value bar is below said stage axis is non-filled, and wherein said second variable variance bar is below said second variable value bar and is filled if said second variable variance is positive, wherein said first target value and said second target value are not graphically shown on said graphical display means.

13. The apparatus according to claim 12 wherein said first variable comprises work-in-progress.

14. The apparatus according to claim 12 wherein said second variable comprises production moves.

15. The apparatus according to claim 12 wherein said filled bars comprise any of the group of: color filled, texture filled, and gray-scale filled.

16. The apparatus according to claim 12 wherein said manufacturing process comprises integrated circuit manufacturing.

17. The apparatus according to claim 12 wherein said graphical display means is further capable of displaying said first variable, said first variable variance, said second variable, and said second variable variance for said stage as text data.

18. The apparatus according to claim 17 wherein said text data is displayed in response to a user input device.

19. The apparatus according to claim 12 wherein said graphical display means is further capable of displaying a sub-category bar above said first variable variance bar wherein said sub-category bar comprises an amount of said first variable within a defined subcategory and wherein said sub-category bar is distinctively filled.

20. A data processing and display method for use in interactive manufacturing process management comprising:

uploading a first variable value for a manufacturing stage from a database;

subtracting said first variable value from a first target value to obtain a first variable variance;

displaying a first variable variance bar above a stage axis on a graphical display device wherein said first variable variance bar is non-filled if said first variable variance is positive and is filled if said first variable variance is negative;

uploading a second variable value for said manufacturing stage from said database;

subtracting said second variable value from a second target value to obtain a second variable variance;

displaying a second variable value bar below said stage axis on said graphical display device wherein said second variable value bar is non-filled and extends downwardly from said stage axis to a depth proportional to a magnitude of said second variable value; and displaying a second variable variance bar below said second variable bar on said graphical display device and extending downwardly from said second variable bar to a depth proportional to a magnitude of said second variable variance, wherein if said second variable variance is positive, said second variable variance bar is filled, wherein said first target value and said second target value are not graphically shown on said graphical display device.

* * * * *